(12) United States Patent
Meirav et al.

(10) Patent No.: US 11,207,633 B2
(45) Date of Patent: Dec. 28, 2021

(54) SYSTEMS AND METHODS FOR CLOSED-LOOP HEATING AND REGENERATION OF SORBENTS

(71) Applicant: enVerid Systems, Inc., Needham, MA (US)

(72) Inventors: Udi Meirav, Newton, MA (US); Sharon Perl-Olshvang, Newton, MA (US); Israel Morejon, Tampa, FL (US)

(73) Assignee: ENVERID SYSTEMS, INC., Westwood, MA (US)

( * ) Notice: Subject to any disclaimer, the term of this patent is extended or adjusted under 35 U.S.C. 154(b) by 381 days.

(21) Appl. No.: 16/095,209

(22) PCT Filed: Apr. 19, 2017

(86) PCT No.: PCT/US2017/028444
§ 371 (c)(1),
(2) Date: Oct. 19, 2018

(87) PCT Pub. No.: WO2017/184780
PCT Pub. Date: Oct. 26, 2017

(65) Prior Publication Data
US 2019/0143258 A1    May 16, 2019

Related U.S. Application Data

(60) Provisional application No. 62/324,349, filed on Apr. 19, 2016.

(51) Int. Cl.
*B01D 53/04* (2006.01)
(52) U.S. Cl.
CPC ..... *B01D 53/0446* (2013.01); *B01D 53/0438* (2013.01); *B01D 53/0454* (2013.01);
(Continued)

(58) Field of Classification Search
None
See application file for complete search history.

(56) References Cited

U.S. PATENT DOCUMENTS

| | | |
|---|---|---|
| 1,522,480 A | 1/1925 | Allen |
| 1,836,301 A | 12/1931 | Bechthold |

(Continued)

FOREIGN PATENT DOCUMENTS

| | | |
|---|---|---|
| CA | 2 640 152 A1 | 4/2010 |
| CN | 2141873 Y | 9/1993 |

(Continued)

OTHER PUBLICATIONS

Ashrae. ANSI/Ashrae Standard 62.1-2013 Ventilation for Acceptable Indoor Air Quality. American Society of Heating, Refrigerating and Air-Conditioning Engineers, Inc., Atlanta, GA; 2013, 58 pages.
(Continued)

*Primary Examiner* — Derek N Mueller
(74) *Attorney, Agent, or Firm* — Cooley LLP

(57) ABSTRACT

Some embodiments of the present disclosure present closed-loop heating, temperature-swing adsorption regenerative scrubbing systems and methods. In some embodiments, such embodiments include providing a scrubbing system including a sorbent material, a plurality of dampers for controlling airflow over and/or through the sorbent according to an absorption mode, a closed-loop heating mode and a flushing mode, first controlling of the plurality of dampers so as to establish flowing an indoor airflow over and/or through the adsorbent during the adsorption mode, second controlling of the plurality of dampers so as to establish a closed loop airflow during the closed-loop heating mode, and third controlling of the plurality of dampers so as to establish a purging airflow during the flushing mode.

11 Claims, 5 Drawing Sheets

(52) U.S. Cl.
CPC ...... *B01D 53/0462* (2013.01); *B01D 2256/14* (2013.01); *B01D 2257/502* (2013.01); *B01D 2257/504* (2013.01); *B01D 2257/708* (2013.01); *B01D 2258/06* (2013.01); *B01D 2259/4508* (2013.01); *Y02C 20/40* (2020.08)

(56) References Cited

U.S. PATENT DOCUMENTS

| | | |
|---|---|---|
| 2,633,928 A | 4/1953 | Chamberlain |
| 3,042,497 A | 7/1962 | Johnson et al. |
| 3,107,641 A | 10/1963 | Haynes |
| 3,344,050 A | 9/1967 | Mayland et al. |
| 3,511,595 A | 5/1970 | Fuchs |
| 3,594,983 A | 7/1971 | Yearout |
| 3,619,130 A | 11/1971 | Ventriglio et al. |
| 3,702,049 A | 11/1972 | Morris, Jr. |
| 3,751,848 A | 8/1973 | Ahlstrand |
| 3,751,878 A | 8/1973 | Collins |
| 3,795,090 A | 3/1974 | Barnebey |
| 3,808,773 A | 5/1974 | Reyhing et al. |
| 3,885,927 A | 5/1975 | Sherman et al. |
| 3,885,928 A | 5/1975 | Wu |
| 4,182,743 A | 1/1980 | Rainer et al. |
| 4,228,197 A | 10/1980 | Means |
| 4,249,915 A | 2/1981 | Sirkar et al. |
| 4,292,059 A | 9/1981 | Kovach |
| 4,322,394 A | 3/1982 | Mezey et al. |
| 4,325,921 A | 4/1982 | Aiken et al. |
| 4,409,006 A | 10/1983 | Mattia |
| 4,433,981 A | 2/1984 | Slaugh et al. |
| 4,451,435 A | 5/1984 | Hölter et al. |
| 4,472,178 A | 9/1984 | Kumar et al. |
| 4,530,817 A | 7/1985 | Hölter et al. |
| 4,551,304 A | 11/1985 | Holter et al. |
| 4,559,066 A | 12/1985 | Hunter et al. |
| 4,711,645 A | 12/1987 | Kumar et al. |
| 4,810,266 A | 3/1989 | Zinnen et al. |
| 4,816,043 A | 3/1989 | Harrison |
| 4,863,494 A | 9/1989 | Hayes |
| 4,892,719 A | 1/1990 | Gesser |
| 4,917,862 A | 4/1990 | Kraw et al. |
| 4,976,749 A | 12/1990 | Adamski et al. |
| 4,987,952 A | 1/1991 | Beal et al. |
| 5,046,319 A | 9/1991 | Jones |
| 5,087,597 A | 2/1992 | Leal et al. |
| 5,109,916 A | 5/1992 | Thompson |
| 5,137,548 A | 8/1992 | Grenier et al. |
| 5,149,343 A | 9/1992 | Sowinski |
| 5,186,903 A | 2/1993 | Cornwell |
| 5,194,158 A | 3/1993 | Matson |
| 5,221,520 A | 6/1993 | Cornwell |
| 5,231,063 A | 7/1993 | Fukumoto et al. |
| 5,281,254 A | 1/1994 | Birbara et al. |
| 5,290,345 A | 3/1994 | Osendorf et al. |
| 5,292,280 A | 3/1994 | Janu et al. |
| 5,322,473 A | 6/1994 | Hofstra et al. |
| 5,352,274 A | 10/1994 | Blakley |
| 5,376,614 A | 12/1994 | Birbara et al. |
| 5,389,120 A | 2/1995 | Sewell et al. |
| 5,407,465 A | 4/1995 | Schaub et al. |
| 5,443,625 A | 8/1995 | Schaffhausen |
| 5,464,369 A | 11/1995 | Federspiel |
| 5,471,852 A | 12/1995 | Meckler |
| 5,492,683 A | 2/1996 | Birbara et al. |
| 5,584,916 A | 12/1996 | Yamashita et al. |
| 5,614,000 A | 3/1997 | Kalbassi et al. |
| 5,646,304 A | 7/1997 | Acharya et al. |
| 5,672,196 A | 9/1997 | Acharya et al. |
| 5,675,979 A | 10/1997 | Shah |
| 5,702,505 A | 12/1997 | Izumi et al. |
| 5,707,005 A | 1/1998 | Kettler et al. |
| 5,827,355 A | 10/1998 | Wilson |
| 5,869,323 A | 2/1999 | Horn |
| 5,876,488 A | 3/1999 | Birbara et al. |
| 5,904,896 A | 5/1999 | High |
| 5,948,355 A | 9/1999 | Fujishima et al. |
| 5,964,927 A | 10/1999 | Graham et al. |
| 5,984,198 A | 11/1999 | Bennett et al. |
| 6,024,781 A | 2/2000 | Bülow et al. |
| 6,027,550 A | 2/2000 | Vickery |
| 6,102,793 A | 8/2000 | Hansen |
| 6,113,674 A | 9/2000 | Graham et al. |
| 6,120,581 A | 9/2000 | Markovs et al. |
| 6,123,617 A | 9/2000 | Johnson |
| 6,187,596 B1 | 2/2001 | Dallas et al. |
| 6,254,763 B1 | 7/2001 | Izumi et al. |
| 6,280,691 B1 | 8/2001 | Homeyer et al. |
| 6,364,938 B1 | 4/2002 | Birbara et al. |
| 6,375,722 B1 | 4/2002 | Henderson et al. |
| 6,402,809 B1 | 6/2002 | Monereau et al. |
| 6,428,608 B1 | 8/2002 | Shah et al. |
| 6,432,367 B1 | 8/2002 | Munk |
| 6,432,376 B1 | 8/2002 | Choudhary et al. |
| 6,533,847 B2 | 3/2003 | Seguin et al. |
| 6,547,854 B1 | 4/2003 | Gray et al. |
| 6,605,132 B2 | 8/2003 | Fielding |
| 6,623,550 B2 | 9/2003 | Dipak et al. |
| 6,711,470 B1 | 3/2004 | Hartenstein et al. |
| 6,726,558 B1 | 4/2004 | Meirav |
| 6,773,477 B2 | 8/2004 | Lindsay |
| 6,796,896 B2 | 9/2004 | Laiti |
| 6,797,246 B2 | 9/2004 | Hopkins |
| 6,866,701 B2 | 3/2005 | Meirav |
| 6,908,497 B1 | 6/2005 | Sirwardane |
| 6,916,239 B2 | 7/2005 | Siddaramanna et al. |
| 6,916,360 B2 | 7/2005 | Seguin et al. |
| 6,930,193 B2 | 8/2005 | Yaghi et al. |
| 6,964,692 B2 | 11/2005 | Gittleman et al. |
| 6,974,496 B2 | 12/2005 | Wegeng et al. |
| 7,288,136 B1 | 10/2007 | Gray et al. |
| 7,407,533 B2 | 8/2008 | Steins |
| 7,407,633 B2 | 8/2008 | Potember et al. |
| 7,449,053 B2 | 11/2008 | Hallam |
| 7,472,554 B2 | 1/2009 | Vosburgh |
| 7,645,323 B2 | 1/2010 | Massenbauer-Strafe et al. |
| 7,662,746 B2 | 2/2010 | Yaghi et al. |
| 7,666,077 B1 | 2/2010 | Thelen |
| 7,802,443 B2 | 9/2010 | Wetzel |
| 7,846,237 B2 | 12/2010 | Wright et al. |
| 7,891,573 B2 | 2/2011 | Finkam et al. |
| 8,157,892 B2 | 4/2012 | Meirav |
| 8,210,914 B2 | 7/2012 | McMahan et al. |
| 8,317,890 B2 | 11/2012 | Raether et al. |
| 8,398,753 B2 | 3/2013 | Sergi et al. |
| 8,491,710 B2 | 7/2013 | Meirav |
| 8,690,999 B2 | 4/2014 | Meirav et al. |
| 8,734,571 B2 | 5/2014 | Golden et al. |
| 9,316,410 B2 | 4/2016 | Meirav et al. |
| 9,328,936 B2 | 5/2016 | Meirav et al. |
| 9,399,187 B2 | 7/2016 | Meirav et al. |
| 9,566,545 B2 | 2/2017 | Meirav et al. |
| 9,802,148 B2 | 10/2017 | Meirav et al. |
| 9,919,257 B2 | 3/2018 | Meirav et al. |
| 9,939,163 B2 | 4/2018 | Meirav et al. |
| 9,950,290 B2 | 4/2018 | Meirav et al. |
| 9,976,760 B2 | 5/2018 | Meirav et al. |
| 9,987,584 B2 | 6/2018 | Meirav et al. |
| 10,046,266 B2 | 8/2018 | Meirav et al. |
| 10,086,324 B2 | 10/2018 | Meirav |
| 10,281,168 B2 | 5/2019 | Meirav et al. |
| 10,525,401 B2 | 1/2020 | Meirav et al. |
| 10,675,582 B2 | 6/2020 | Meirav et al. |
| 10,730,003 B2 | 8/2020 | Meirav |
| 10,765,990 B2 | 9/2020 | Meirav et al. |
| 10,792,608 B2 | 10/2020 | Meirav et al. |
| 10,850,224 B2 | 12/2020 | Meirav et al. |
| 10,913,026 B2 | 2/2021 | Meirav et al. |
| 2001/0021363 A1 | 9/2001 | Poles et al. |
| 2001/0054415 A1 | 12/2001 | Hanai et al. |
| 2002/0056373 A1 | 5/2002 | Fielding |
| 2002/0078828 A1 | 6/2002 | Kishkovich et al. |
| 2002/0083833 A1 | 7/2002 | Nalette et al. |
| 2002/0147109 A1 | 10/2002 | Branover et al. |
| 2002/0183201 A1 | 12/2002 | Barnwell et al. |

(56) References Cited

U.S. PATENT DOCUMENTS

| | | |
|---|---|---|
| 2002/0193064 A1 | 12/2002 | Michalakos et al. |
| 2003/0037672 A1 | 2/2003 | Sircar |
| 2003/0041733 A1 | 3/2003 | Sequin et al. |
| 2003/0097086 A1 | 5/2003 | Gura |
| 2003/0188745 A1 | 10/2003 | Deas et al. |
| 2004/0005252 A1 | 1/2004 | Siess |
| 2004/0020361 A1 | 2/2004 | Pellegrin |
| 2004/0069144 A1 | 4/2004 | Wegeng et al. |
| 2004/0118287 A1 | 6/2004 | Jaffe et al. |
| 2005/0133196 A1 | 6/2005 | Gagnon et al. |
| 2005/0147530 A1 | 7/2005 | Kang et al. |
| 2005/0191219 A1 | 9/2005 | Uslenghi et al. |
| 2005/0262869 A1 | 12/2005 | Tongu et al. |
| 2005/0284291 A1 | 12/2005 | Alizadeh-Khiavi et al. |
| 2005/0288512 A1 | 12/2005 | Butters et al. |
| 2006/0032241 A1 | 2/2006 | Gontcharov et al. |
| 2006/0054023 A1 | 3/2006 | Raetz et al. |
| 2006/0079172 A1 | 4/2006 | Fleming et al. |
| 2006/0112708 A1 | 6/2006 | Reaves |
| 2006/0148642 A1 | 7/2006 | Ryu et al. |
| 2006/0225569 A1 | 10/2006 | Schmidt et al. |
| 2006/0236867 A1 | 10/2006 | Neary |
| 2006/0249019 A1 | 11/2006 | Roychoudhury et al. |
| 2008/0119356 A1 | 3/2008 | Ryu et al. |
| 2008/0078289 A1 | 4/2008 | Sergi et al. |
| 2008/0127821 A1 | 6/2008 | Noack et al. |
| 2008/0135060 A1 | 6/2008 | Kuo et al. |
| 2008/0173035 A1 | 7/2008 | Thayer et al. |
| 2008/0182506 A1 | 7/2008 | Jackson et al. |
| 2008/0210768 A1 | 9/2008 | You |
| 2008/0216653 A1 | 9/2008 | Paton-Ash et al. |
| 2008/0293976 A1 | 11/2008 | Olah et al. |
| 2009/0000621 A1 | 1/2009 | Haggblom et al. |
| 2009/0044704 A1 | 2/2009 | Shen et al. |
| 2009/0071062 A1 | 3/2009 | Hedman |
| 2009/0120288 A1 | 5/2009 | Lackner et al. |
| 2009/0188985 A1 | 7/2009 | Scharing et al. |
| 2009/0214902 A1 | 8/2009 | Pelman |
| 2009/0220388 A1 | 9/2009 | Monzyk et al. |
| 2009/0260372 A1 | 10/2009 | Skinner et al. |
| 2010/0076605 A1 | 3/2010 | Harrod et al. |
| 2010/0154636 A1 | 6/2010 | Liu et al. |
| 2010/0224565 A1 | 9/2010 | Dunne et al. |
| 2010/0254868 A1 | 10/2010 | Obee et al. |
| 2010/0262298 A1 | 10/2010 | Johnson et al. |
| 2010/0275775 A1 | 11/2010 | Griffiths et al. |
| 2010/0278711 A1 | 11/2010 | Find |
| 2011/0064607 A1 | 3/2011 | Hedman |
| 2011/0079143 A1 | 4/2011 | Marotta et al. |
| 2011/0085933 A1 | 4/2011 | Mazyek et al. |
| 2011/0146494 A1 | 6/2011 | Desai et al. |
| 2011/0179948 A1 | 7/2011 | Choi et al. |
| 2011/0189075 A1 | 8/2011 | Wright et al. |
| 2011/0192172 A1 | 8/2011 | Delacruz |
| 2011/0206572 A1 | 8/2011 | McKenna et al. |
| 2011/0250121 A1 | 10/2011 | Schmidt |
| 2011/0262327 A1 | 10/2011 | Dillon et al. |
| 2011/0269919 A1 | 11/2011 | Min et al. |
| 2011/0277490 A1 | 11/2011 | Meirav |
| 2011/0296872 A1 | 12/2011 | Eisenberger |
| 2012/0004092 A1 | 1/2012 | Raatschen et al. |
| 2012/0012005 A1 | 1/2012 | Burke |
| 2012/0052786 A1 | 3/2012 | Clawsey |
| 2012/0076711 A1 | 3/2012 | Gebald et al. |
| 2012/0129267 A1 | 5/2012 | Daly |
| 2012/0137876 A1 | 6/2012 | Miller |
| 2012/0148858 A1 | 6/2012 | Wu |
| 2012/0152116 A1 | 6/2012 | Barclay et al. |
| 2012/0168113 A1 | 7/2012 | Karamanos |
| 2012/0216676 A1 | 8/2012 | Addiego et al. |
| 2012/0222500 A1 | 9/2012 | Riess et al. |
| 2012/0271460 A1 | 10/2012 | Rognili |
| 2012/0272966 A1 | 11/2012 | Ando et al. |
| 2012/0311926 A1 | 12/2012 | Mittelmark |
| 2012/0321511 A1 | 12/2012 | Lorcheim |
| 2013/0052113 A1 | 2/2013 | Molins et al. |
| 2013/0291732 A1 | 11/2013 | Meirav |
| 2013/0331021 A1 | 12/2013 | Rodell |
| 2014/0013956 A1 | 1/2014 | Ericson et al. |
| 2014/0242708 A1 | 8/2014 | Lundgren |
| 2014/0298996 A1 | 10/2014 | Meirav et al. |
| 2015/0078964 A1 | 3/2015 | Meirav et al. |
| 2015/0258488 A1* | 9/2015 | Meirav ............... F24F 11/30 95/115 |
| 2015/0297771 A1 | 10/2015 | Law et al. |
| 2016/0228811 A1 | 8/2016 | Meirav et al. |
| 2016/0271556 A1 | 9/2016 | Okano |
| 2016/0363333 A1 | 12/2016 | Meirav et al. |
| 2017/0227241 A1 | 8/2017 | Claesson et al. |
| 2018/0147526 A1 | 5/2018 | Meirav et al. |
| 2018/0187907 A1 | 7/2018 | Meirav et al. |
| 2018/0236396 A1 | 8/2018 | Meirav et al. |
| 2018/0264396 A1 | 9/2018 | Meirav et al. |
| 2018/0339261 A1 | 11/2018 | Meirav et al. |
| 2018/0339262 A1 | 11/2018 | Perl-Olshvang et al. |
| 2019/0186762 A1 | 6/2019 | Meirav et al. |
| 2019/0247782 A1 | 8/2019 | Meirav et al. |
| 2019/0262761 A1 | 8/2019 | Meirav |
| 2019/0299154 A1 | 10/2019 | Meirav et al. |
| 2019/0344211 A1 | 11/2019 | Meirav et al. |
| 2019/0346161 A1 | 11/2019 | Meirav et al. |
| 2020/0139294 A1 | 5/2020 | Meirav et al. |
| 2020/0166235 A1 | 5/2020 | Marra et al. |

FOREIGN PATENT DOCUMENTS

| | | |
|---|---|---|
| CN | 2612444 Y | 4/2004 |
| CN | 2729562 Y | 9/2005 |
| CN | 1872388 A | 12/2006 |
| CN | 101001767 A | 7/2007 |
| CN | 101072620 A | 11/2007 |
| CN | 200993448 Y | 12/2007 |
| CN | 101199913 A | 6/2008 |
| CN | 101444693 A | 6/2009 |
| CN | 101500704 A | 8/2009 |
| CN | 101564634 A | 10/2009 |
| CN | 201363833 Y | 12/2009 |
| CN | 201618493 U | 11/2010 |
| CN | 102233217 A | 11/2011 |
| CN | 202032686 U | 11/2011 |
| CN | 202270445 U | 6/2012 |
| CN | 103119376 A | 5/2013 |
| DE | 102006048716 B3 | 2/2008 |
| EP | 0 475 493 A2 | 3/1992 |
| EP | 2 465 596 A1 | 6/2012 |
| ES | 2 387 791 A1 | 10/2012 |
| JP | 56-158126 A | 12/1981 |
| JP | 59-225232 A | 12/1984 |
| JP | 60-194243 A | 10/1985 |
| JP | 02-092373 A | 4/1990 |
| JP | 03-207936 A | 9/1991 |
| JP | 05-161843 A | 6/1993 |
| JP | 06-031132 A | 2/1994 |
| JP | 08-114335 A | 5/1996 |
| JP | 09-085043 A | 3/1997 |
| JP | 2000-202232 A | 7/2000 |
| JP | 2000-291978 A | 10/2000 |
| JP | 2001-170435 A | 6/2001 |
| JP | 2001-232127 A | 8/2001 |
| JP | 3207936 B2 | 9/2001 |
| JP | 2004-150778 A | 5/2004 |
| JP | 2005-090941 A | 4/2005 |
| JP | 2006-275487 A | 10/2006 |
| JP | 2009-150623 A | 7/2009 |
| JP | 2009-202137 A | 9/2009 |
| JP | 2010-149086 A | 7/2010 |
| JP | 2015-148227 A | 8/2015 |
| WO | WO 88/05693 A1 | 8/1988 |
| WO | WO 02/08160 A1 | 1/2002 |
| WO | WO 02/12796 A2 | 2/2002 |
| WO | WO 2006/016345 A1 | 2/2006 |
| WO | WO 2007/128584 A1 | 11/2007 |
| WO | WO 2008/155543 A2 | 12/2008 |
| WO | WO 2009/126607 A2 | 10/2009 |

(56) References Cited

FOREIGN PATENT DOCUMENTS

| | | |
|---|---|---|
| WO | WO 2010/091831 A1 | 8/2010 |
| WO | WO 2010/124388 A1 | 11/2010 |
| WO | WO 2011/114168 A1 | 9/2011 |
| WO | WO 2011/146478 A1 | 11/2011 |
| WO | WO 2012/071475 A1 | 5/2012 |
| WO | WO 2012/100149 A1 | 7/2012 |
| WO | WO 2012/120173 A1 | 9/2012 |
| WO | WO 2012/134415 A1 | 10/2012 |
| WO | WO 2012/145303 A2 | 10/2012 |
| WO | WO 2012/152930 A1 | 11/2012 |
| WO | WO 2012/158911 A2 | 11/2012 |
| WO | WO 2013/012622 A1 | 1/2013 |
| WO | WO 2013/074973 A1 | 5/2013 |
| WO | WO 2013/106573 A1 | 7/2013 |
| WO | WO 2014/015138 A2 | 1/2014 |
| WO | WO 2014/047632 A1 | 3/2014 |
| WO | WO 2014/078708 A1 | 5/2014 |
| WO | WO 2014/153333 A1 | 9/2014 |
| WO | WO 2014/176319 A1 | 10/2014 |
| WO | WO 2015/042150 A1 | 3/2015 |
| WO | WO 2015/123454 A1 | 8/2015 |
| WO | WO 2017/019628 A1 | 2/2017 |

OTHER PUBLICATIONS

Bennett, D. et al. (Oct. 2011) Indoor Environmental Quality and Heating, Ventilating, and Air Conditioning Survey of Small and Medium Size Commercial Buildings: Field Study. California Energy Commission. CEC-500-2011-043, 233 pages.

Gesser, H.D., "The Reduction of Indoor Formaldehyde Gas and that Emanating from Urea Formaldehyde Foam Insulation," Environmental International, 10:305-308 (1984).

Goeppert, A. et al., "Carbon Dioxide Capture from the Air Using a Polyamine Based Regenerable Solid Adsorbent," J. Am. Chem. Soc., 133:20164-20167 (2011).

Gray, M.L. et al., "Performance of immobilized tertiary amine solid sorbents for the capture of carbon dioxide," International Journal of Greenhouse Gas Control, 2:3-8 (2008).

Hodgson, A.T. and Levin, H. (Apr. 21, 2003) Volatile Organic Compounds in Indoor Air: A Review of Concentrations Measured in North America Since 1990. Report LBNL-51715, Berkeley, California: Environmental Energy Technologies Division, E.O. Lawrence Berkeley National Laboratory; 31 pages.

Hotchi, T. et al. (Jan. 2006) "Indoor Air Quahty Impacts of a Peak Load Shedding Strategy for a Large Retail Building" Report LBNL-59293. Berkeley, California: Environmental Energy Technologies Division, E.O. Lawrence Berkeley National Laboratory; 17 pages.

Jones, C.W., "CO2 Capture from Dilute Gases as a Component of Modern Global Carbon Management," Annu. Rev. Chem. Biomol. Eng., 2:31-52 (2011).

Kang, D-H. et al. (Jun. 14, 2007) "Measurements of VOCs emission rate from building materials during bakeout with passive sampling methods" Clima 2007 WellBeing Indoors, REHVA World Congress, Jun. 10-14, 2007, Helsinki, Finland. O. Seppänen and J. Säteri (Eds.) FINVAC [online]. Retrieved from: http://www.inive.org/members_area/medias/pdf/Inive%5Cclima2007%5CA12%5CA12C1334.pdf, 6 pages.

Ma, C. et al., "Removal of low-concentration formaldehyde in air by adsorption on activated carbon modified by hexamethylene diamine," Carbon, 49:2873-2875 (2011).

Nuckols, M. L. et al., Technical Manual: Design Guidelines for Carbon Dioxide Scrubbers. Naval Coastal Systems Center, NCSC Tech Man 4110, Revision A, Jul. 1985, 10 pages.

Offerman, F.J. et al. (1991) "A Pilot Study to Measure Indoor Concentrations and Emmission Rates of Polycyclic Aromatic Hydrocarbons" Indoor Air, 4:497-512.

Serna-Guerrero, R. et al., "Triamine-grafted pore-expanded mesoporous silica for CO2 capture: Effect of moisture and adsorbent regeneration strategies," Adsorption, 16:567-575 (2010).

Sidheswaran, M.A. et al., "Energy efficient indoor VOC air cleaning with activated carbon filter (ACF) filters," Building and Environment, 47:357-367 (2012).

United States Environmental Protection Agency, "Carbon Adsorption for Control of VOC Emissions: Theory and Full Scale System Performance", EPA-450/3-88-012, Jun. 1988, 84 pages.

United States Environmental Protection Agency, "EPA Ventilation and Air Quality in Offices, Fact Sheet" Air and Radiation (6609J), 402-F-94-003, Revised Jul. 1990, 4 pages.

Wu, X. et al. (2011) "Volatile Organic Compounds in Small- and Medium-Sized Commercial Buildings in California. Suporting Information" Environ Sci Technol, 45(20):S1-S29 [online]. Retrieved from: https://pubs.acs.org/doi/suppl/10.1021/es202132u/suppl_file/es202132u_si_001.pdf.

Zorflex® ACC, 100% Activated Woven Carbon Cloth. Calgon Carbon Corporation, 2008, www.calgoncarbon.com, 2 pages.

Zorflex® ACC, 100% Activated Woven Carbon Cloth, Calgon Carbon Corporation, 2011, www.calgoncarbon.com, 2 pages.

International Preliminary Examination Report on Patentability dated Oct. 23, 2018, for International Patent Application No. PCT/US2017/028444, by Enverid Systems, Inc., 9 pages.

International Search Report and Written Opinion, dated Jul. 18, 2017, for PCT/US2017/28444, by Enverid Systems, Inc., 10 pages.

Pickenpaugh, Joseph G., Capt (Mar. 2013) *Assessment of Potential Carbon Dioxide-Based Demand Control Ventilation System Performance in Single Zone Systems*. Thesis, Air Force Institute of Technology. https://apps.dtic.mil/dtic/tr/fulltext/u2/a576145.pdf; 105 pages.

\* cited by examiner

SYSTEMS AND METHODS FOR CLOSED-LOOP HEATING AND REGENERATION OF SORBENTS

CROSS REFERENCE TO RELATED APPLICATIONS

This application is a 35 U.S.C. § 371 national stage entry of PCT/US2017/028444, filed Apr. 19, 2017, titled "Systems and Methods for Closed-Loop Heating and Regeneration of Sorbents", which claims priority to U.S. Provisional Patent Application No. 62/324,349, entitled "Partial Closed Loop Regeneration," filed Apr. 19, 2016, which is incorporated by reference herein in its entirety.

FIELD OF THE DISCLOSURE

Embodiments of the present disclosure generally relate to scrubbing air and contaminant removal therefrom.

BACKGROUND

Indoor air quality (IAQ) is an important consideration for numerous human-occupied spaces including buildings, residential homes, vehicles and other closed spaces occupied by humans. In part, IAQ is affected by various gas contaminants, meaning molecular species that are found indoors at a concentration higher than in natural atmospheric air. Examples of such indoor gas contaminants include carbon dioxide (CO2), carbon monoxide, volatile organic compounds (VOCs) including aldehydes, radon, inorganic compound gases, and even ozone. It is desirable to remove some of these contaminants so as to achieve a better environment for the occupants of the space. One important method of cleaning molecular contaminants from indoor air is the use of scrubbers with regenerable sorbents. These are materials that under certain conditions or temperature, pressure and contaminant concentration capture contaminant molecules (adsorption), also referred to as the adsorbates or the adsorbate species; and in other conditions can release the adsorbates (desorption, outgassing, or regeneration which is used interchangeably herein), thus enabling extended use in a cyclical pattern or adsorption and regeneration, known as a swing adsorption cycle. The "swing" refers to the change in conditions that induced the transition from adsorption to desorption.

In a typical scrubbing application, adsorption is achieved in the scrubber by streaming incoming ambient air through one or more beds of permeable adsorbent material that are placed in the scrubber. After some time, the adsorbent begins to saturate and loses its adsorptive properties, at which point it undergoes regeneration.

In conventional temperature swing adsorption (TSA) and temperature/concentration swing adsorption (TCSA), regeneration is achieved by a combination of heating a sorbent material and flushing it with a purge gas. The heating of the sorbent induces desorption, also referred to as evaporation or outgassing of the adsorbates, further enabled by the flow of purge gas to maintain a low concentration of the contaminant species in the vicinity of the sorbent. Without the flow of gas, the desorption process is suppressed by increasing concentration of the contaminant in the ambient surrounding of the sorbent, which is why the constant flow of the purge gas is essential for effective regeneration.

In some embodiments, the heating of the sorbent may be achieved indirectly, by heating the incoming purge gas, as it may be more difficult to apply heat directly to the sorbent itself. In this scenario, the purge gas serves two functions: heating the sorbent and carrying away the contaminant molecules as they evaporate off of the sorbent.

This form of regeneration requires a substantial amount of energy to continually heat up large amounts of incoming purge gas. Additionally, long cool-down time may be necessary after regeneration before the sorbent can be put back to work as an effective adsorbing agent.

SUMMARY OF SOME OF THE EMBODIMENTS

In some embodiments, a close-loop heating, temperature-swing adsorption scrubbing system including a regenerative sorbent material, a fan, a heater, a first inlet having a controllable damper and configured to receive indoor air, a first outlet having a controllable damper and configured to return indoor air that has flowed over and/or through the sorbent, a second outlet having a controllable damper and configured to expel a purging airflow to an external environment, and at least one bypass conduit having a bypass damper and configured to establish a closed loop airflow between the fan, the heater and the sorbent, where the bypass damper is configured to control an airflow in the bypass conduit. The system also includes a controller configured to control the bypass damper, the fan, the heater, and the inlet and outlet dampers so as to allow the system to operate in an adsorption mode, where:
  the first inlet damper is open, the bypass damper is closed, the first outlet damper is open, the second outlet damper is closed, the heater is off, and one or more adsorbates in the indoor air are absorbed by the sorbent;
a closed-loop heating mode, where:
  the first inlet damper is closed, the bypass damper is open, the first outlet damper is closed, the second outlet damper is closed, the heater is on, and trapped air within the closed loop is circulated by the fan over the heater to heat the air and then over and/or through the sorbent to heat the sorbent;
and a flushing mode, where:
  the first outlet damper is closed, the second outlet damper is at least partially open, the purging airflow is directed over the heated sorbent to push or otherwise direct adsorbates released from the sorbent caused by heating and exhausted out the second outlet.

Such embodiments (and other embodiments) can include one and/or another of the following additional features, functionalities, structure, and/or clarifications, leading to still further embodiments of the present disclosure:
  in the flushing mode, the damper for the first inlet is open and the purging airflow comprises indoor air;
  a second inlet having a controllable damper and configured to receive air from an external air source, wherein in the flushing mode, the damper for the second inlet is open and the purging airflow comprises external air;
  in the flushing mode, the bypass damper is at least partially open establishing a partial closed loop allowing a fraction $P_e$ of the purging airflow to be exhausted from the second outlet, and a fraction of the $P_r$ of the purging airflow to flow through the bypass conduit;
  the flushing mode comprises plurality of flushing modes;
  each flushing mode of the plurality of flushing modes is determined by changing at least one of: the amount each damper is open, the speed of the fan, and the duration that the heater is on;
  the controller is further configured to control the bypass damper, the fan, the heater, and the inlet and outlet dampers so as to allow the system to operate additionally in a bleeding mode so as to maintain $P_e$ below $P_r$, where $P_e$ can be less than approximately 80%, less than approximately 50%, or less than approximately 20%, and the purging airflow is indoor air or outdoor air.

In some embodiments, a closed-loop heating, temperature-swing adsorption regenerative scrubbing method is provided and includes providing a scrubbing system including a sorbent material, a plurality of dampers for controlling airflow over and/or through the sorbent according to an absorption mode, a closed-loop heating mode and a flushing mode, first controlling of the plurality of dampers so as to establish flowing an indoor airflow over and/or through the sorbent during the adsorption mode, second controlling of the plurality of dampers so as to establish a closed loop airflow during the closed-loop heating mode, and third controlling of the plurality of dampers so as to establish a purging airflow during the flushing mode.

In some embodiments, an sorbent regeneration method for regenerating a sorbent in a temperature swing adsorption cycle and includes during a closed-loop heating phase, recirculating a closed volume of air over and/or through the sorbent while concurrently heating the recirculating air such that the temperature of the sorbent is gradually increased, the closed volume of air being recirculated for a predetermined duration or until an required sorbent regeneration temperature is reached, and during a purge phase, flowing air from an external air source over and/or through the heated sorbent and exhausting the air to the external environment thereafter, wherein at least one adsorbate species that has previously been adsorbed by the sorbent is removed.

Such embodiments (and other embodiments) can include one and/or another of the following additional features, functionalities, structure, and/or clarifications, leading to still further embodiments of the present disclosure:

the closed-loop heating phase and purge phase are repeated, during the purge phase, a fraction $P_r$ of the air flowing over and/or through the sorbent is recirculated in an immediate subsequent closed-loop phase and the complementary fraction $P_e$ is exhausted, where $P_e$ is less than approximately 80%, less than approximately 50%, or less than approximately 20%, and the external air source is indoor air or outdoor air.

These and other embodiments, objects and advantages will be even more understood by reference to the accompanying drawings and detailed description.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION OF SOME OF THE EMBODIMENTS

In the following description, various aspects of the present invention will be described with reference to different embodiments. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Figure 1A:
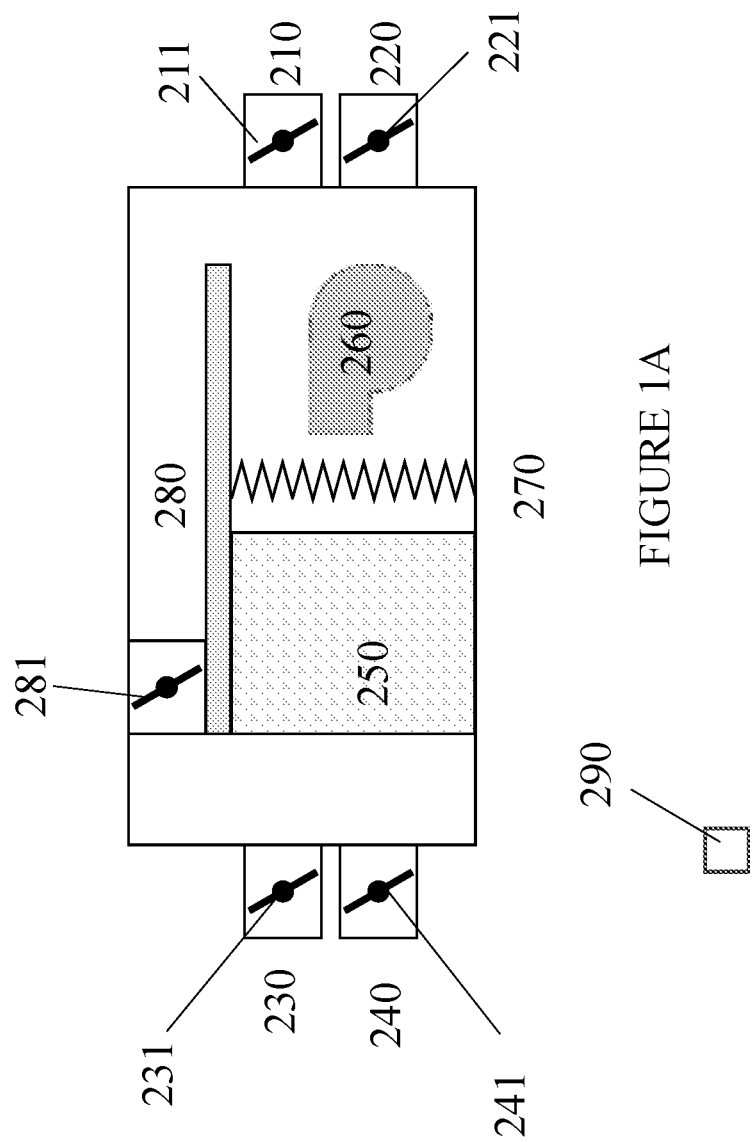
FIG. 1A is an illustration of a scrubber configured with a closed loop system constructed and operative according to an embodiment of the present disclosure.

In some embodiments, a controllable closed loop for gas circulation creates a multi-step regeneration sequence that separates the heating of the sorbent from the flushing of the adsorbate. FIG. 1A shows a scrubber within a system for scrubbing gas contaminants from air using temperature swing adsorption with partial closed loop regeneration, thus configured. The scrubber may comprise an inlet for indoor air 210 with a corresponding damper 211, an inlet for purge gas 220 with a corresponding damper 221, an outlet for cleaned indoor air 230 with a corresponding damper 231, an outlet for purge gas (or exhaust) 240 with a corresponding damper 241, a sorbent section 250, a fan 260, and a heating coil for regeneration 270. According to some embodiments, the scrubber may be further configured with a closed loop bypass conduit 280 and a bypass damper 281. There may be further provided an electronic controller 290 that can modify the position of the bypass damper 281, as well as control the fan 260, the heater 270 and the other additional dampers. The electronic controller 290 may be positioned within the scrubber or external thereto and in communication therewith. The sorbent section 250 may comprise a sorbent material (also referred to as an "adsorbent material"). An exemplary sorbent material may be a solid support material supporting an amine-based compound, such as disclosed in applicant's PCT application PCT/US12/38343, which is incorporated herein by reference in its entirety. Other sorbent materials include, but are not limited to, granular adsorbent particles, clay-based adsorbents, carbon, activated carbon, zeolites, natural zeolite, activated charcoal, molecular sieves, silica, silica gel, porous silica, alumina, porous alumina, titanium oxide, carbon fibers, porous polymers, polymer fibers and metal organic frameworks.

Figure 1B:
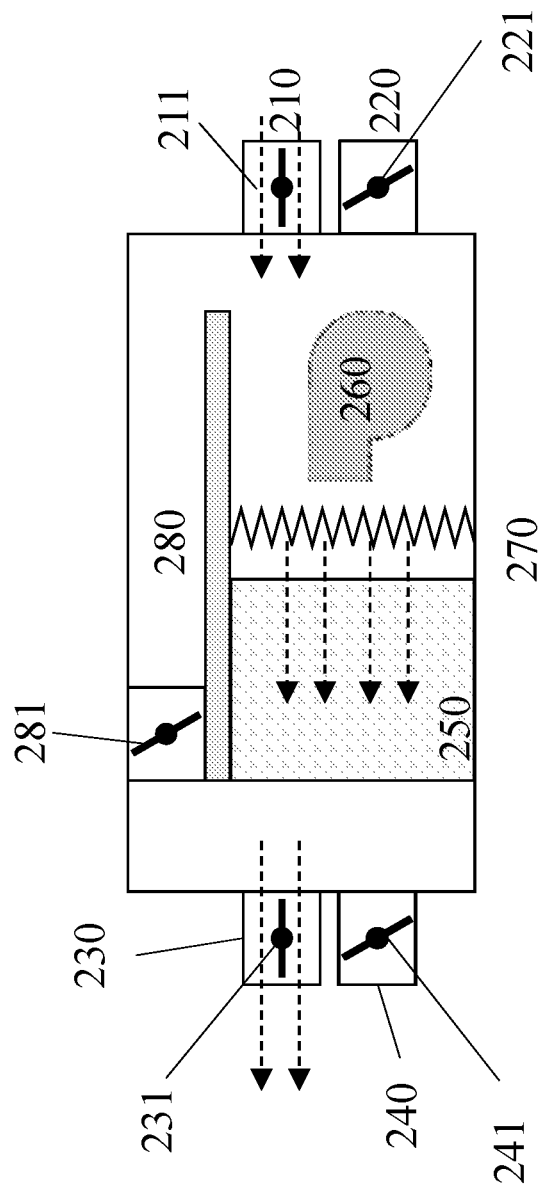
FIGS. 1B-1D are each a schematic illustration of an operating mode of a closed loop system according to an embodiment of the present disclosure.

FIG. 1B shows the scrubber operating in adsorption phase of a TSA cycle. This is achieved by opening damper 211 and 231, while the fan urges air to enter through inlet 210 and exit through outlet 230.

Figure 1C:
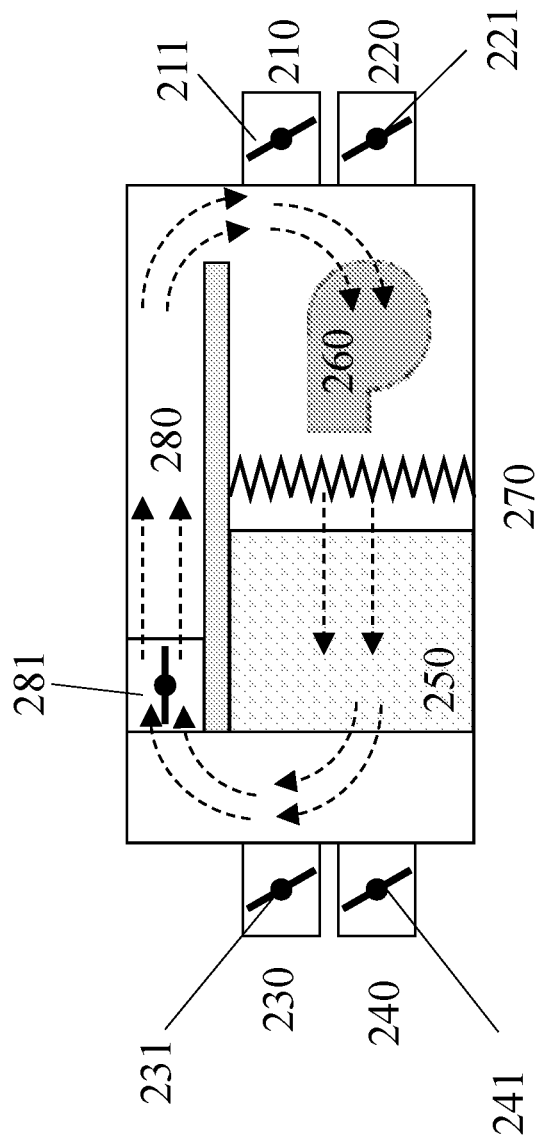

Regeneration occurs in several steps. In some embodiments, a first step is shown in FIG. 1C. This step—which can be called "closed loop heating mode"—all the external dampers including 211, 221, 231 and 241 are closed, and the bypass damper 281 is open. The fan 260 is operating and the heating coil 270 is heated. The air inside the scrubber is recirculated in a closed loop, through the sorbent, while the heating coil 270 or other heating device may heat the circulating air. This means that a small volume of gas is heated and kept warm while most of the heat is utilized to warm the sorbent itself, rather than a constant stream of purge gas. In some embodiments, the purge gas comprises indoor air and/or outdoor air or fresh air.

As long as the external dampers are closed and air is recirculating, the evaporating adsorbate is not removed from the air volume and thus the concentration of adsorbate species in the circulating air increases, to the point that it hinders further evaporation. In other words, the sorbent temperature increases but much of the adsorbate remains on the surface of the sorbent.

Figure 1D:
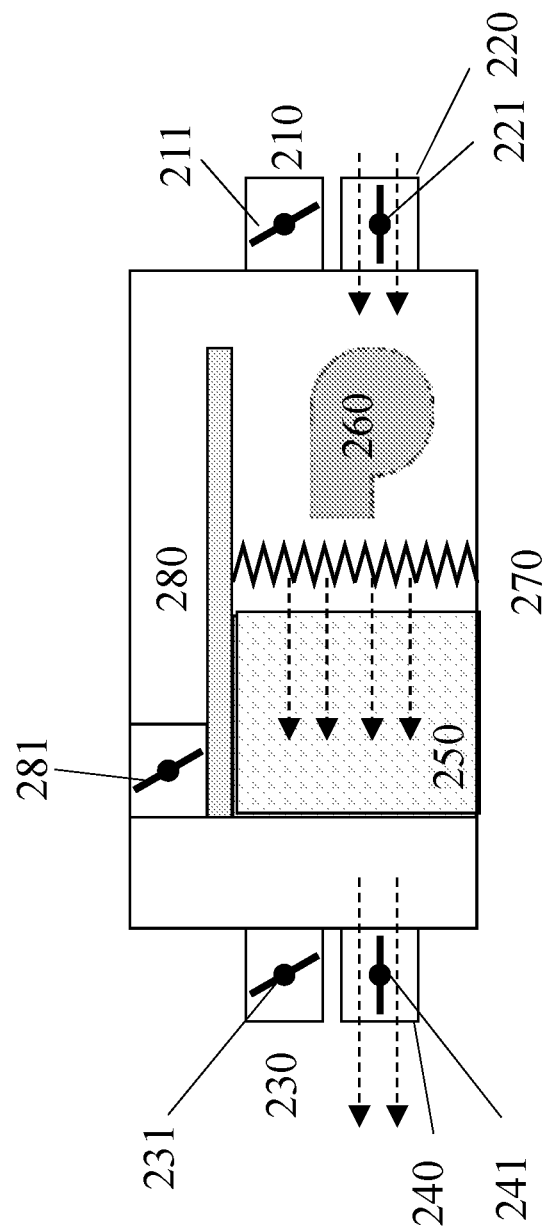

In some embodiments, as seen in FIG. 1D, once a target temperature is reached, the system switches to an open mode, or a "flushing" mode, by opening the exhaust outlet damper 241 and the purge inlet 221 and closing the bypass damper 281 while the fan continues to operate. This causes incoming purge gas to flow through the sorbent and directly to an exhaust. During this phase, adsorbate continues to outgas while being carried away. If the purge gas is kept warm, the sorbent stays warm and outgassing continues while the adsorbate is depleted from the sorbent. Thus in some embodiments, the heating coil 270 is maintained hot during the first part of the flushing mode.

In some embodiments, during the open flushing mode the heater may be turned off. As a result, the fresh purge gas is not kept warm, the sorbent gradually cools. Initially the sorbent may continue outgassing its adsorbates; at some point, the outgassing subsides and eventually stops, whether because it is depleted or because the sorbent temperature has decreased.

In some embodiments, if the sorbent cools too quickly, the system can be programmed to switch back to closed loop heating mode and then again to flush mode, and do so multiple times until sufficient amount of adsorbate has been successfully removed from the sorbent. A temperature sensor (not shown) can be installed inside the scrubber to monitor the temperature. Its reading is provided to control circuit that controls the dampers, the fan and the heater, and the circuit is programmed to maintain the desirable duration and temperature of the various phases of the regeneration process.

In designing the closed loop regeneration there is a tradeoff between, on the one hand, maintaining the sorbent without using too much heating power—which requires less fresh purge gas and less exhaust—and on the other hand, removing the evaporated adsorbates from the vicinity of the sorbent so that they do not impede further evaporation or outgassing.

Figure 2:
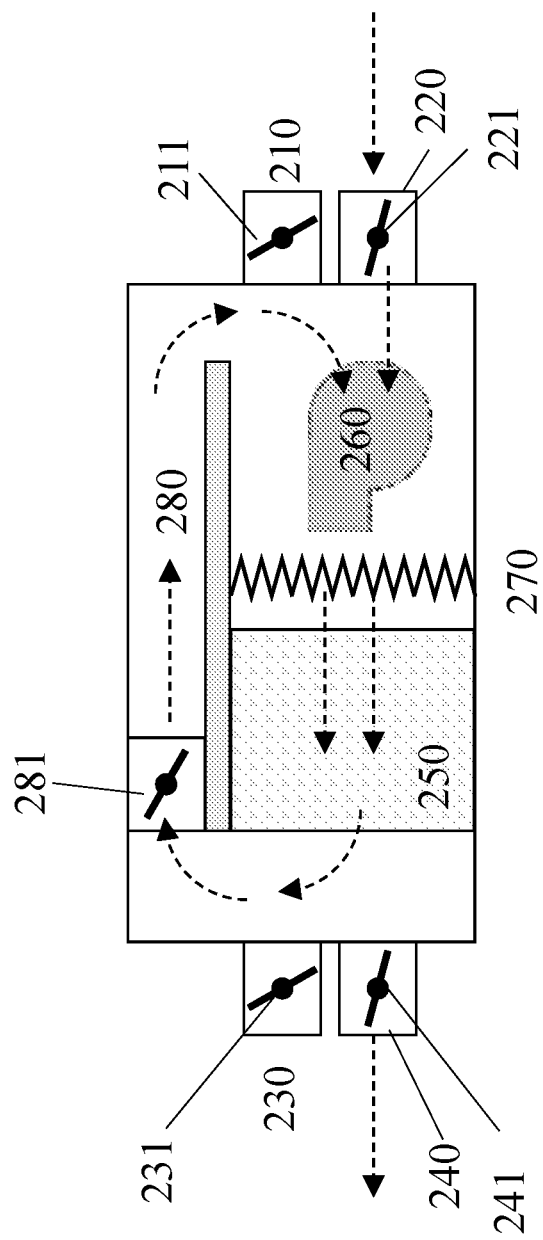
FIG. 2 is a schematic illustration of an operating mode of a closed loop system according to an embodiment of the present disclosure.

Some embodiments utilize hybrid regeneration to address this tradeoff by introducing partial closed loop circulation. As seen in FIG. 2, partial closed loop is implemented by partially or fully opening the inlet damper 221, the outlet damper 241, and also partially or fully opening the bypass damper 281. In partial-loop mode, while a stream of gas flows through the sorbent, part of the stream proceeds towards the outlet/exhaust 240, while the remainder is diverted back through the bypass 280, which means that it returns to the fan 260 and the sorbent 250, passing through the heating element 270 on the way.

The returning purge gas is also augmented by a certain amount of fresh purge gas, whereby the two are mixed, heated (if the heater is on) and then forced to flow through the sorbent. The amount of fresh purge gas naturally equals the amount of exhaust, to balance the net air volume of the scrubber.

In this hybrid or partial closed loop mode, the total airflow through the sorbent is a combination of fresh purge gas with recirculating gas returning through the closed-loop bypass 280. The ratio of exhaust to return air (namely recirculated air), which is determined by the partial or complete opening of dampers along each of the two possible paths, can be modified by controlling the mechanical position of the dampers. In some embodiments, variably controlled dampers are configured and controlled by the electronic control circuits so achieve the desired operating conditions at different stages of the regenerating procedure.

The total airflow comprises a certain percentage $P_e$ of exhaust and a complementary percentage $P_r$ of recirculation, where (by definition) $P_e+P_r=100\%$. It is noted that $P_e$ also represents the percentage of fresh incoming purge gas. As explained above, these percentages can be changed by modifying the positioning of the exhaust damper 241, the inlet damper 221, and/or the bypass damper 281.

When $P_e$ is small compared with $P_r$, the load on the heating element is small since most of the circulating air has already been heated. However, the rate of dilution of the circulating air is also lower and there could be greater buildup of adsorbate concentration in the circulating air.

In contrast, higher $P_e$ relative to $P_r$ keeps the purge gas more diluted, namely lower adsorbate concentration, but typically requires more heat to maintain its temperature or, alternatively, causes a gradual cool down of the sorbent. A low exhaust ratio, namely low $P_e$ mode, may be referred to as a "bleeding" mode, implying that a small fraction of the recirculating air is "bleeding out" to the exhaust, whereas the majority is recirculated. In some embodiments, a bleeding mode comprises less than 10% exhaust, which implies more than 90% recirculated. In other embodiments, a bleeding mode comprises less than 50% exhaust. In other embodiments, a bleeding mode comprises less than 20% exhaust. In other conditions, the exhaust percentage can be much higher. In some embodiments exhaust exceeds 50%. In some embodiments, exhaust exceeds 80%. In some embodiments, the bleeding mode is enabled by configuring the dampers so as to maintain $P_e$ substantially below $P_r$.

In some embodiments, regeneration in a closed-loop enabled scrubber comprises a sequence of steps or stages, each characterized by the operational mode of the various dampers, the heater and the fan. In one embodiment, an optimal regeneration sequence may comprise five steps, as follows, in a non-limiting example.

Step 1: Closed-loop heating for 20 minutes, wherein the sorbent approaches a target temperature of 60° C.
Step 2: Bleeding 10% of circulation, heater still on to maintain temperature of 60° C.
Step 3: Bleeding 20% of circulation, heater still on (more dilution required as evaporation rate declines, making evaporation more sensitive to ambient adsorbate concentration).
Step 4: Bleeding 30% of circulation, heater off, slow cool down begins while still outgassing.
Step 5: Open loop purge, bypass damper closed, accelerating cool down while extracting remaining amount of adsorbate.

Another control parameter in regeneration is the total flow, which is controlled by the fan and can be modified by use of a variable speed fan. More flow generally uses more energy but flushes the sorbent more effectively and cools down faster. Flow can be described in terms of absolute rate e.g. CFM or liters per second, or in terms of % (i.e. ratio) of maximum fan speed.

Overall, a regeneration sequence comprises a series of steps or phases, each step may be characterized by:
a) Duration
b) Damper settings, e.g. in terms of % opening relative to fully opened position for each damper
c) Heater setting (typically on/off or a thermostat feedback based on the gas temperature).

d) In case of variable speed fan, the fan speed can be one of the settings of each phase Exemplary regeneration sequences are shown in Tables 1 and 2.

Table 1 shows an exemplary regeneration sequence:

TABLE 1

| Step | Duration | Fan speed | Exhaust (%) | Heater |
| --- | --- | --- | --- | --- |
| Preheat (closed) | 10 min | 100% | 0% | Max |
| Bleed 1 (partial) | 15 min | 60% | 20% | Set point 60° C. |
| Bleed 2 (partial) | 10 min | 60% | 40% | Set point 60° C. |
| Purge (open) | 5 min | 80% | 100% | Off |
| Cool down (open) | 5 min | 100% | 100% | Off |

Table 2 shows another exemplary regeneration sequence:

TABLE 2

| Step | Duration | Fan speed | Exhaust (%) | Heater |
| --- | --- | --- | --- | --- |
| Preheat (closed) | 5 min | 100% | 0% | Set point 60° C. |
| Bleed (partial) | 20 min | 100% | 10% | Set point 60° C. |
| Purge (open) | 10 min | 100% | 20% | Off |

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be an example and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure. Some embodiments may be distinguishable from the prior art for specifically lacking one or more features/elements/functionality (i.e., claims directed to such embodiments may include negative limitations).

In addition, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A close-loop heating, temperature-swing adsorption scrubbing system comprising:
   a regenerative sorbent material;
   a fan;
   a heater;
   a first inlet having a controllable damper and configured to receive indoor air;
   a first outlet having a controllable damper and configured to return indoor air that has flowed over and/or through the sorbent,
   a second outlet having a controllable damper and configured to expel a purging airflow to an external environment;
   at least one bypass conduit having a bypass damper and configured to establish a closed loop airflow between the fan, the heater and the sorbent, wherein the bypass damper is configured to control an airflow in the bypass conduit;
   a controller configured to control the bypass damper, the fan, the heater, and the first inlet and first and second outlet dampers so as to allow the system to operate in:
      an adsorption mode, wherein: the first inlet damper is open, the bypass damper is closed, first outlet damper is open, the second outlet damper is closed, the heater is off, and one or more adsorbates in the indoor air are absorbed by the sorbent;
      a closed-loop heating mode, wherein: the first inlet damper is closed, the bypass damper is open, the first outlet damper is closed, the second outlet damper is closed, the heater is on, and trapped air within the closed loop is circulated by the fan over the heater to heat the air and then over and/or through the sorbent to heat the sorbent; and
      a flushing mode, wherein: the first outlet damper is closed, the second outlet damper is at least partially open, the purging airflow is directed over the heated sorbent to push or otherwise direct adsorbates released from the sorbent caused by heating and exhausted out the second outlet.

2. The system of claim 1, wherein in the flushing mode, the first inlet damper is open and the purging airflow comprises indoor air.

3. The system of claim 1, further comprising a second inlet having a controllable second inlet damper and configured to receive air from an external air source, wherein in the flushing mode, the second inlet damper is open and the purging airflow comprises external air.

4. The system of claim 1, wherein in the flushing mode, the bypass damper is at least partially open establishing a partial closed loop allowing a fraction $P_e$ of the purging airflow to be exhausted from the second outlet, and a fraction $P_r$ of the purging airflow to flow through the bypass conduit.

5. The system of claim 1, wherein the flushing mode comprises a plurality of flushing modes.

6. The system of claim 5, wherein each flushing mode of the plurality of flushing modes is determined by changing at least one of: the amount each damper is open, the speed of the fan, and the duration that the heater is on.

7. The system of claim 4, wherein the controller is further configured to control the bypass damper, the fan, the heater, and the first inlet damper and first and second outlet dampers so as to allow the system to operate additionally in a bleeding mode so as to maintain $P_e$ below $P_r$.

8. The system of claim 4, wherein $P_e$ is less than 80%.

9. The system of claim 4, wherein $P_e$ is less than 50%.

10. The system of claim 4, wherein $P_e$ is less than 20%.

11. The system of claim 1, wherein the purging airflow is indoor air or outdoor air.

* * * * *